(No Model.)

F. H. BURNHAM.
FEED BAG.

No. 369,393. Patented Sept. 6, 1887.

WITNESSES:
William H. Parry
E. G. Emanuel

INVENTOR:
Francis H. Burnham,
Sylvenus J. Walker,
Attorney

UNITED STATES PATENT OFFICE.

FRANCIS H. BURNHAM, OF IPSWICH, MASSACHUSETTS.

FEED-BAG.

SPECIFICATION forming part of Letters Patent No. 369,393, dated September 6, 1887.

Application filed January 3, 1887. Serial No. 223,332. (No model.)

*To all whom it may concern:*

Be it known that I, FRANCIS H. BURNHAM, of Ipswich, in the county of Essex and State of Massachusetts, have invented an Improvement in Feed-Bags, of which the following is a specification.

The object of my invention is to provide a cheap, simple, convenient, and durable feed-bag for horses which shall permit the horse to eat the food placed therein without obstructing his breathing, which is a serious objection to many of those heretofore constructed, causing the horse to throw up his head and violently try to release or free the same from smothering him while partaking of the contents; and it consists in the construction, combination, and arrangement of the several parts forming the bag, as hereinafter more fully described, and specifically set forth in the claim.

Figure 1:
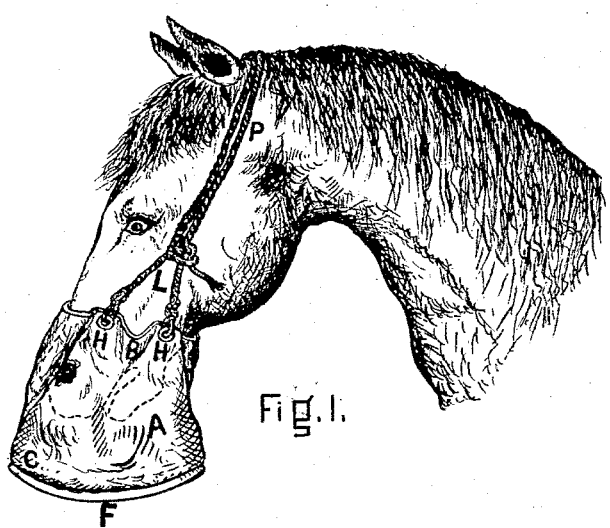
Figure 2:
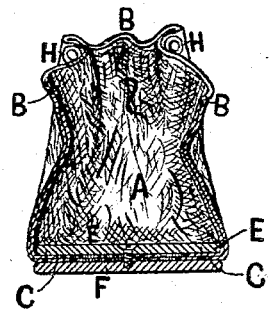

Figure 1 represents a feed-bag constructed to embody my invention, and showing the same in position on a horse's head. Fig. 2 represents a vertical central section of the feed-bag with the attaching ropes or straps removed.

A represents a woven seamless tubular bag formed double or of two thicknesses of material, forming a folded top edge or mouth, B, the two cut bottom end portions, C, being turned inwardly over the edges of a circular disk or suitably-shaped wood bottom, E, and secured thereto by nails, glue, or other suitable fastening. Then an auxiliary wood bottom, F, is secured over the inward-turned edges of the bag by means of nails or screws driven through the said bottom E from the inside of the said bag and into the outer bottom, F, as shown, whereby the bag is very firmly secured to the bottom E F. The grain of one crossing the grain of the other when secured together in position renders the bottom very light and strong, and as there are no screws or nails entering the under side of the bottom, the same are prevented from rusting by the frequent contact with wet ground when in use.

Near the top edge of the bag I insert four large eyelets, H, passing through vertical folds formed in the double fabric, so that each eyelet passes through four thicknesses of material, rendering the same very strong and durable. It will be seen and understood that these four folds very materially reduce the mouth or top portion of the bag in size in relation to the bottom, by which means a suitable quantity of grain or feed may be placed within the bag upon the large area of the bottom, which permits the depth of the feed to be very essentially reduced or diminished, which enables the horse to eat the same with much more comfort, and also avoid the danger of the same being wasted by its being thrown out at the top. It, being contracted, comes nearly in contact with the jaws of the horse, as shown, wherein it will be seen that it hangs in folds at the opposite sides of the horse's jaws, so as to allow him to breathe free and unobstructed. Within two of the said eyelets H on opposite sides of the mouth of the bag are secured the ends of a short rope, L, which thereby forms a side loop, as shown; and connected to one of these loops L is a support-rope, P, which is passed up over the head of the horse and downward through the opposite loop L, and thence up over the head again and its free end passed through the former loop and tied. By this means of construction and adjustment the feed-bag is supported at four equidistant points, which serves to retain it in a horizontal position in relation to the bottom upon which the food rests when in use, thus insuring the same being retained in contact with the lips of the horse at all times or until the contents of the bag have been eaten by the horse, and at no time can the depth of the grain or feed be such as to enter the horse's nostrils, causing irritation or uneasiness of the animal, as is frequently the case where improperly-constructed feed-bags are employed for the purpose, usually smallest at the bottom.

It will be seen and understood that suitable support-straps may be employed instead of ropes without departing from my invention.

Having thus described my invention, what I claim is—

A feed-bag consisting of a double seamless woven bag contracted at the mouth and provided with side support-loops connected to the top of the bag at four points, and a support connected to the said loops, and the lower end of the bag provided with a flat rigid bottom, as described.

FRANCIS H. BURNHAM.

Witnesses:
SYLVENUS WALKER,
WILLIAM H. PARRY.